T. MIDGLEY.
BEAD CLEANING MACHINE.
APPLICATION FILED AUG. 4, 1913.

1,180,310.

Patented Apr. 25, 1916.
5 SHEETS—SHEET 1.

Witnesses
Edwin L. Jewell
A. L. Mills

Inventor
Thomas Midgley
by Percy B. Hills
Attorney

T. MIDGLEY.
BEAD CLEANING MACHINE.
APPLICATION FILED AUG. 4, 1913.

1,180,310.

Patented Apr. 25, 1916
5 SHEETS—SHEET 3.

Witnesses
Edwin L. Yewell
A. L. Mills

Inventor
Thomas Midgley
By Percy B. Hills
Attorney

T. MIDGLEY.
BEAD CLEANING MACHINE.
APPLICATION FILED AUG. 4, 1913.
1,180,310.
Patented Apr. 25, 1916.
5 SHEETS—SHEET 4.
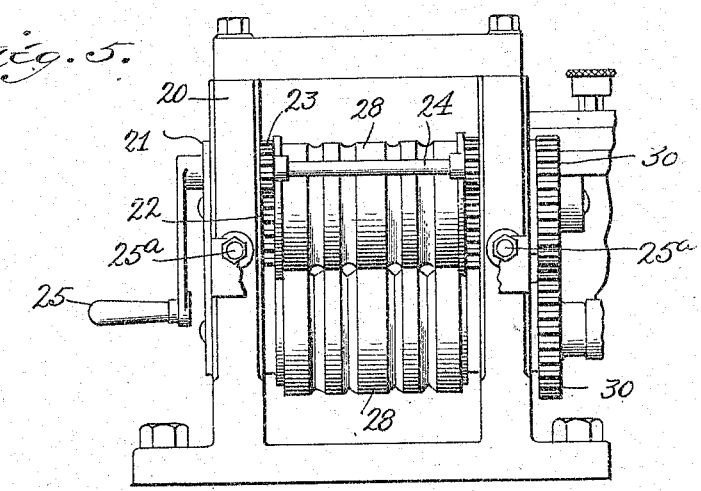
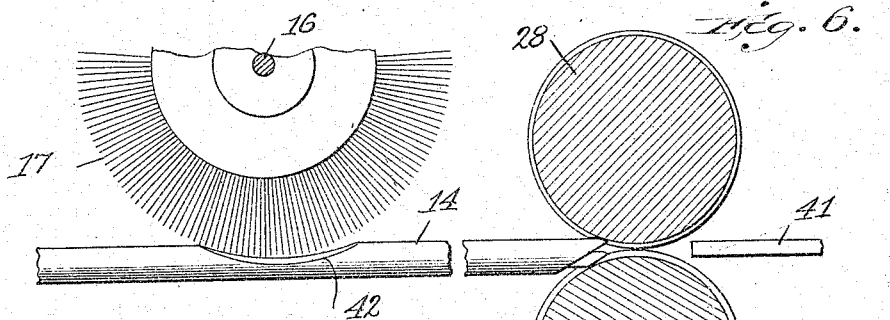
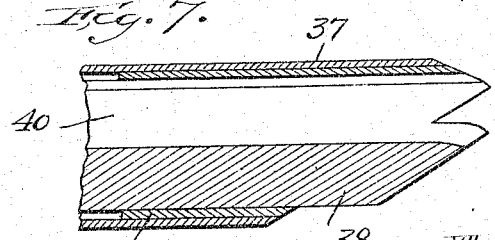
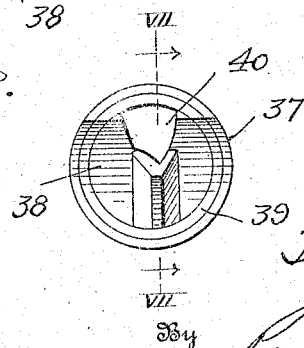
Witnesses
Edwin L. Yewell
A. L. Mills
Inventor
Thomas Midgley
By Percy B. Hills
Attorney

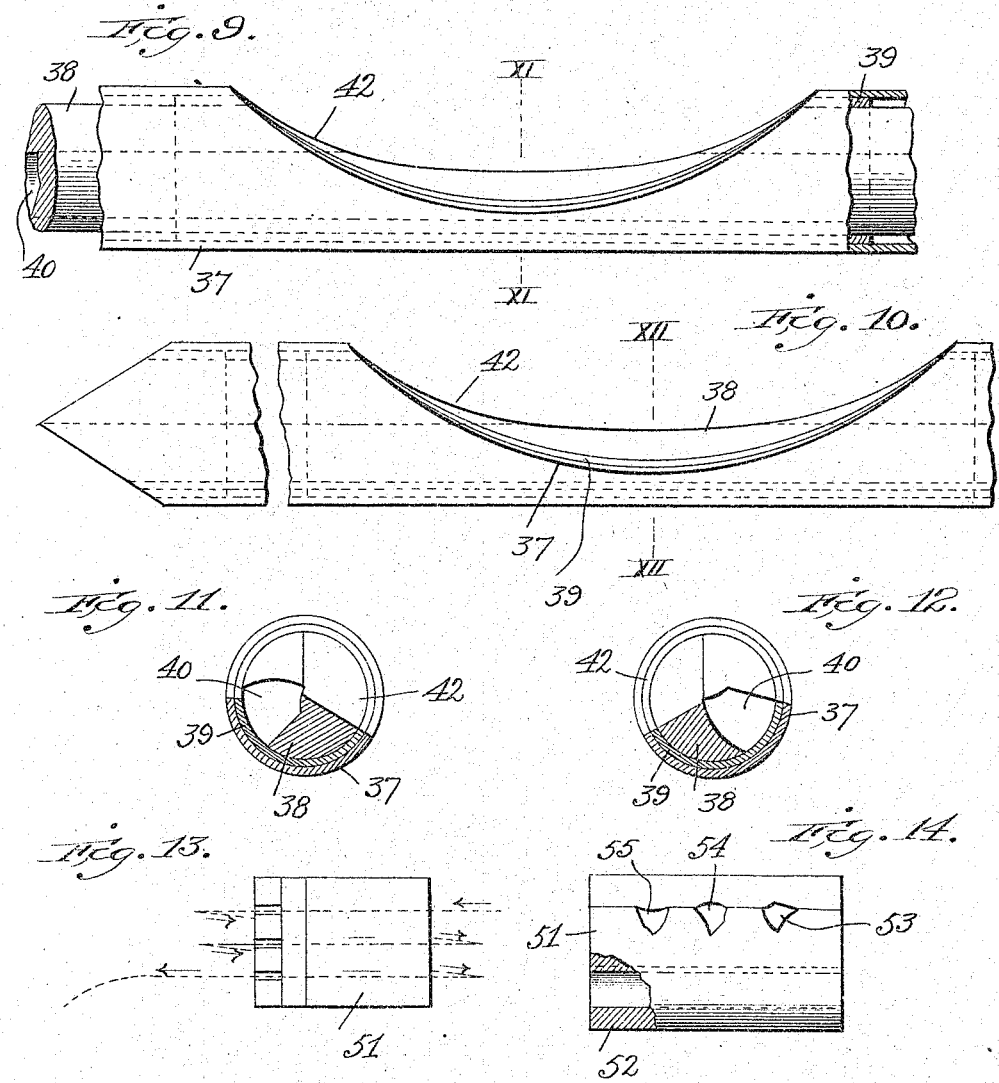

UNITED STATES PATENT OFFICE.

THOMAS MIDGLEY, OF WORTHINGTON, OHIO, ASSIGNOR TO MORGAN & WRIGHT, OF DETROIT, MICHIGAN, A CORPORATION OF MICHIGAN.

BEAD-CLEANING MACHINE.

1,180,310.  Specification of Letters Patent.  Patented Apr. 25, 1916.

Application filed August 4, 1913. Serial No. 782,926.

*To all whom it may concern:*

Be it known that I, THOMAS MIDGLEY, a citizen of the United States, residing at Worthington, county of Franklin, State of Ohio, have invented certain new and useful Improvements in Bead-Cleaning Machines; and I do hereby declare the following to be a full, clear, and exact description of the invention, such as will enable others skilled in the art to which it appertains to make and use the same.

Figure 1:
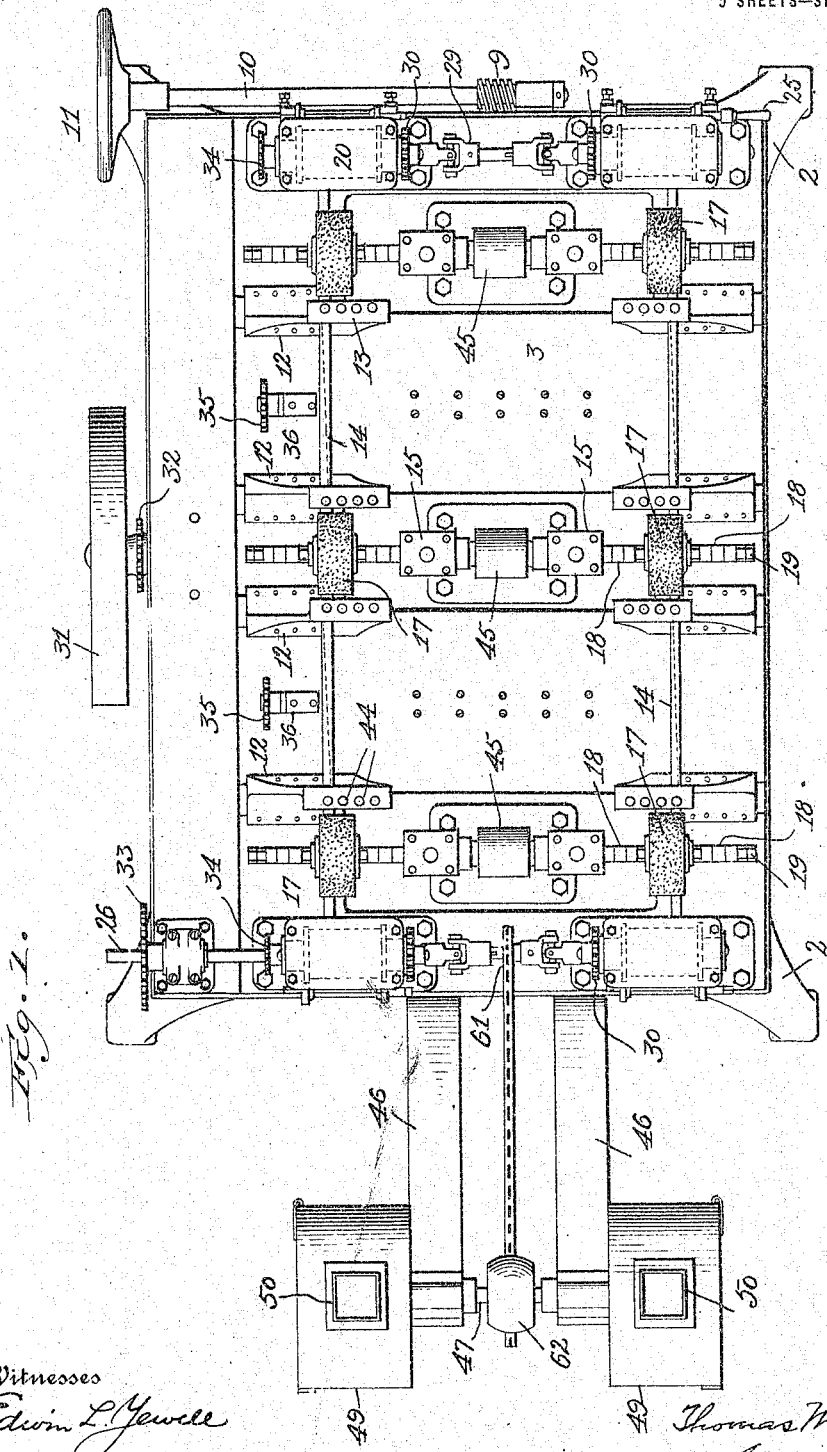
Figure 2:
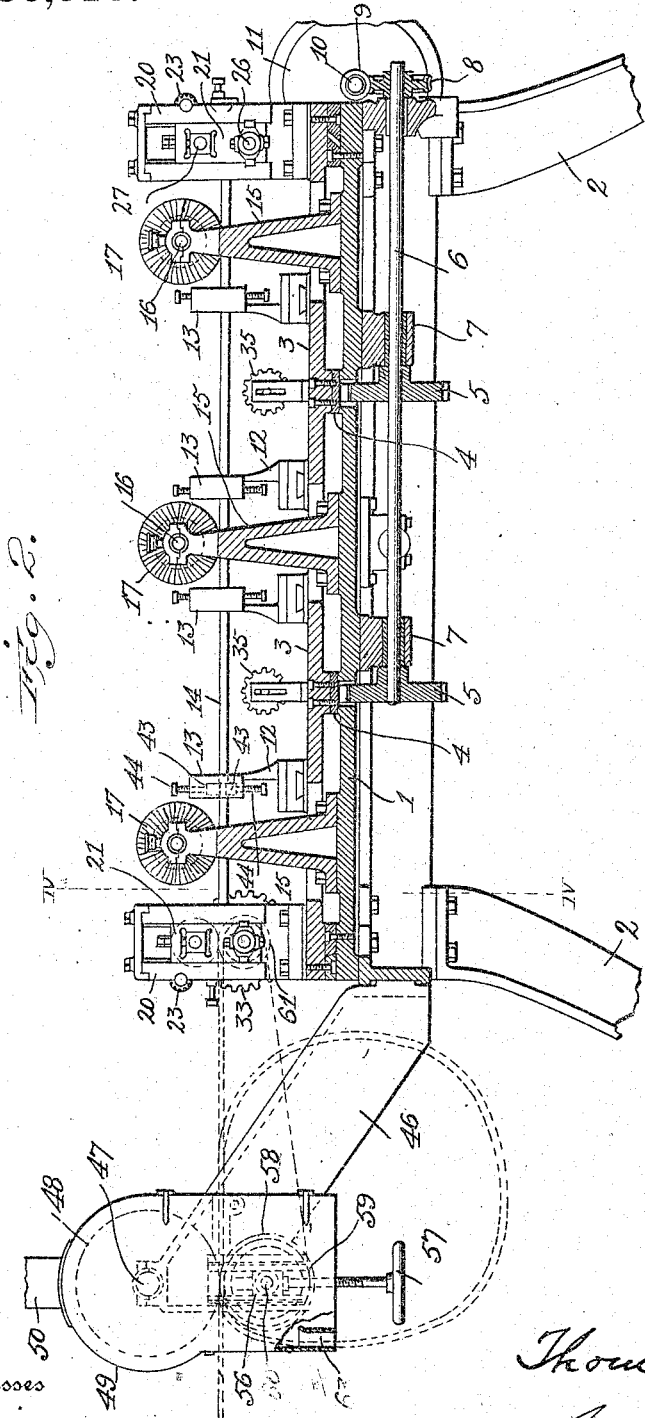
Figure 3:
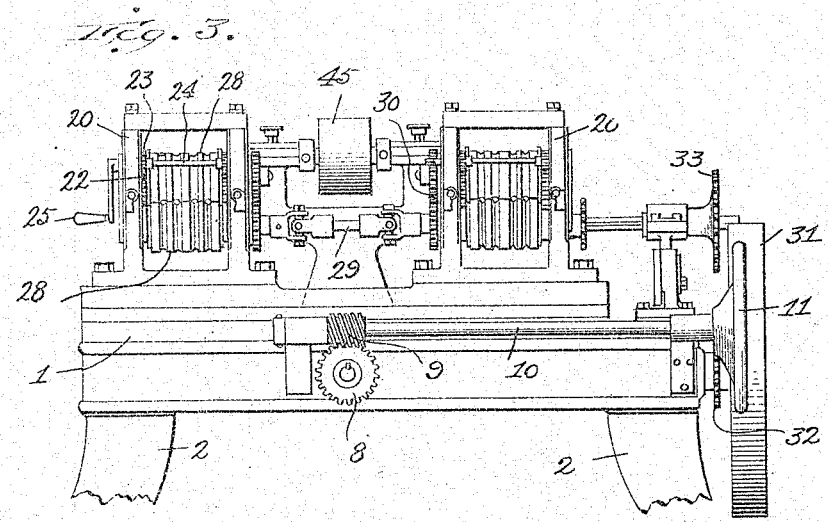
Figure 4:
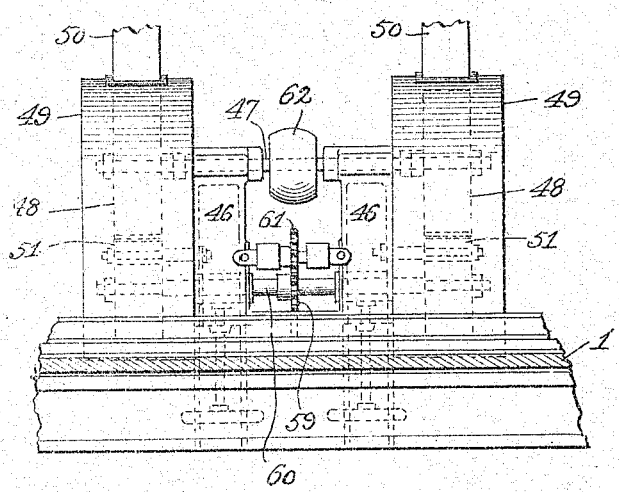

My invention has for its object to provide a machine for brushing or cleaning the beads used in the manufacture of tire casings. Said beads, which are formed and partially vulcanized in pieces of considerable length, are made of what is known as rubber shoddy, and after they leave the vulcanizer, and before they can be coated with rubber cement for use in the tire casings, must be brushed or cleaned thoroughly in order to remove therefrom all dust and bloom from the sulfur, so that the rubber cement may be applied properly thereto. This brushing or cleaning has been done heretofore by hand, and it is the object of my present invention to provide a machine which will act upon these lengths of beads thoroughly to cleanse every side thereof. I accomplish this object in the manner and by the means hereinafter described and claimed, reference being had to the accompanying drawings, in which, Figure 1 is a top plan view of my improved machine. Fig. 2 is a central vertical longitudinal sectional view of the machine, parts being shown in elevation, and the supplemental brusher or cleaner at the discharge end of the machine being shown in side elevation, partly broken away. Fig. 3 is an end elevation of the machine taken at the feed end of the same. Fig. 4 is a transverse sectional view taken on the line IV—IV, Fig. 2, showing the feed drive for the supplemental brusher or cleaner, the latter being shown in elevation. Fig. 5 is an enlarged detail elevation of the feed rollers at the feed end of the machine. Fig. 6 is an enlarged detail of said feed rollers, shown in section, a portion of the guide tube for the bead, and the first of the series of cleaning brushes. Fig. 7 is an enlarged detail longitudinal sectional view of the feed end of one of the guide tubes, taken on the line VII—VII, Fig. 8. Fig. 8 is an end elevation of said guide tube. Fig. 9 is an enlarged detail side elevation of a portion of one of the guide tubes taken at the point where the second brush operates. Fig. 10 is a view similar to Fig. 9, taken at the discharge end of the guide tube. Fig. 11 is a transverse sectional view taken on the line XI—XI, Fig. 9. Fig. 12 is a similar view taken on the line XII—XII, Fig. 10. Fig. 13 is a detail plan view of the guide plate of the supplemental brusher or cleaner, showing diagrammatically the path of travel of the bead through the same. Fig. 14 is a front view of said guide plate, shown partly broken away.

Similar numerals of reference denote corresponding parts in the several views.

In the said drawings the reference numeral 1 denotes the bed plate of my improved machine, the same being mounted on suitable legs 2. Mounted upon and transversely adjustable on said bed plate are two tables 3, each having bolted to its underside a transverse rack plate 4 in mesh with a gear wheel 5, said gear wheels being carried by a common longitudinally disposed shaft 6 carried in bearings 7 on the underside of bed plate 1, said shaft projecting at the feed end of the machine where it carries a worm gear wheel 8, in mesh with a worm 9 on a transverse shaft 10, the latter having a hand wheel 11 at its outer end. Each of said tables 3 has mounted at each corner thereof a bracket 12 carrying supports 13 for the guide tubes 14, hereinafter to be described, said brackets being independently adjustable transversely of the machine on said tables 3, as shown in Fig. 2.

Mounted in brackets 15 bolted to the bed plate 1 is a series of transverse shafts 16, preferably three in number, each of said shafts carrying two buffing wheels 17 disposed on opposite sides of the machine immediately above the guide tubes 14, thus providing two sets of three buffing wheels each, the same being capable of operating independently upon the beads in the two guide tubes or sets of guide tubes 14. Said buffing wheels are adjustable longitudinally of their shafts 16, which adjustment is accomplished preferably by means of washers 18 threaded on the shafts 16 and jam nuts 19, the buffing wheels being adjusted longitudinally on their shafts by shifting said washers.

Bolted to the bed plate 1 at each end of the machine are two brackets 20, disposed in alinement with the brushes 17, and best seen in Figs. 2, 3 and 5. Said brackets form guide ways for the slides 21, the latter carrying racks 22 meshing with gear wheels 23 mounted on transverse shafts 24 and operated by a removable crank 25, whereby said slides 21 may be accurately adjusted vertically in their brackets 20, suitable set screws 25ª providing means for locking said slides in any adjusted position. Carried by the pair of slides 21 in each bracket 20 are two shafts 26 and 27, each having mounted thereon a grooved guide and feed roller 28, the coinciding grooves in said rollers conforming to the triangular configuration of the lengths of beads to be buffed. The lowermost shafts 26 of said pairs of shafts at each end of the machine are connected by toggles 29, whereby they may be driven while adjusted to different heights, and said shafts 26 and 27 are geared together by gears 30 so as to be rotated simultaneously. The drive to said feed rollers 28 is imparted from drive pulley 31 by means of a sprocket chain (not shown) extending from a sprocket wheel 32 on the shaft of said drive pulley to a sprocket wheel 33 mounted on one of the shafts 26, this motion being in turn imparted to the shaft 26 at the other end of the machine by means of a sprocket chain (not shown) extending between sprocket wheels 34 on said shafts 26 and passing over idler sprocket wheels 35 mounted in brackets 36 bolted to the bed plate 1.

The lengths of bead to be buffed being substantially triangular in cross area, it is necessary that each face thereof shall be subjected to the action of one of the buffing wheels 17, and as each of said wheels operates downwardly upon the bead it is necessary to turn said bead automatically during its passage through the machine so as successively to expose its sides one to each buffing wheel 17. This I accomplish by means of the guide tubes 14, the construction of which is best seen in Figs. 6 to 12. Each of said guide tubes consists of an outer tube or casing 37 having disposed therein extending substantially from end to end a helically grooved guide bar 38. Said guide bar is somewhat smaller in diameter than the interior diameter of said casing 37, and is maintained in position centrally in said casing by means of a series of short sleeves 39 interposed between said casing and guide bar, one of said sleeves being located at the feed end of the guide tube 14, as seen in Fig. 7, and another at each point in the length of said guide tube where a buffing wheel 17 operates thereon. The configuration of the groove 40 in said guide rod 38 is such that, in conjunction with said sleeve 39, it offers a cross section corresponding accurately with the substantially triangular contour of the bead 41 to be buffed. It follows, therefore, that as the bead is fed between the rollers 28 at the feed end of the machine, whose coinciding grooves are shaped to receive it only when fed in a predetermined position, it will pass into its guide tube 14, whose receiving end is in immediate proximity to said rollers 28, as seen in Fig. 6, properly turned to enter and fit said guide tube. The casing 37 of said guide tube, as well as the sleeves 39 and the guide bar 38, are cut away at 42 on the arc of a circle coinciding with the circumference of the buffing wheels 17, these cut away portions registering with said buffing wheels, so that the wire bristles forming the buffing surface of the latter will rotate in said grooves in contact with the exposed face of the bead in its passage through the guide tube, as best seen in Fig. 6. The bead 41, in its passage through the guide tube 14 thus will move first past the first cut away portion 42 with one of its three faces exposed to the action of the bristles of the first buffing wheel 17; will then, by reason of the helical character of the groove 40 in the guide bar 38, be given a one third turn to bring uppermost another of its faces as it reaches the second cut away portion 42, when said face will be acted on by the second buffing wheel; and finally, will be given a further one third turn to expose its remaining face to the action of the third buffing wheel at the third cut away portion 42, these successive turns being best illustrated in Figs. 8, 11 and 12, where the three positions of the bead are shown in succession. By employing the short lengths of sleeves 39, instead of a continuous sleeve, I provide a comparatively free space between the successive buffing points for the passage of the bead 41, so that there will be no tendency of the latter to bind, said spaces, however, not being large enough to affect the guiding and turning action of the helical grooves 40 in the guide bar 38.

The detail view in Fig. 5 shows the rollers 28 grooved to receive the beads to be buffed at four points. These grooves may be of different sizes in cross area to receive beads of different sizes, and it will be understood that the size of the guide tubes 14 may be varied accordingly. And in each of the supports 13 for said guide tubes is provided space for four of said guide tubes, though in the drawings but one guide tube 14 is shown in each set of supports 13. As shown in dotted lines in Fig. 2, the guide tubes 14 are clamped between suitably shaped clamps 43, which are in turn adjustable vertically by means of the set screws 44, whereby the height of each guide tube 14 may be adjusted to accommodate it to buffing wheels of varying diameter, the latter necessarily wearing down with use.

In operation the end of the length of bead 41 to be buffed is fed by hand between the rollers 28 at the feed end of the machine and to the groove to suit its size, and by said feed rollers is pushed into its guide tube 14, which has been positioned properly to receive it, the height of said feed rollers 28 in the bracket 20 having been adjusted by means of the slides 21, and the height of the guide tube 14 having been correspondingly adjusted by means of the set screws 44 to suit the diameter of the buffing wheels 17. The bead in its passage through the machine is turned by the helical groove 40 successively to present its three faces to the three buffing wheels 17, the latter being rotated reversely by means of power applied to their shafts 16 through drive bands applied to the pulleys 45 thereon in any suitable manner, and said bead finally reaches and passes through the rollers 28 at the discharge end of the machine. While this buffing of the bead is most efficient, still there is more or less settling of dust on the bead as it comes from the buffing mechanism hereinbefore described which it is necessary to remove, and it has been found desirable to supplement the buffing operation with a brushing operation. This I accomplish by the mechanism shown in Figs. 1, 2, 4, 13 and 14 of the drawing, and which will be described as follows:—Fixed to the machine bed plate 1 at the discharge end thereof are two parallel brackets 46, inclined upwardly, and carrying at their outer ends bearings for the shaft 47 of a bristle brushing wheel 48, the same being located in an open bottomed casing 49 to the upstanding discharge pipe 50 of which a suitable suction device may be connected for carrying off the dust removed from the bead during this brushing operation. Pivoted in said brackets 46, and within the casing 49, is a guide plate 51, best seen in Figs. 13 and 14, an integral apertured lug 52 on its underside serving to receive the pivot bolt forming its support. Said guide plate is formed with three through passages 53, 54 and 55, which when said plate is swung to a horizontal position are disposed in a horizontal plane, and are shaped suitably to receive the bead to be brushed after it leaves the discharge rollers 28 of the machine. As seen in Fig. 14, however, said passages are shaped to receive the bead with different faces thereof presented uppermost. Thus, the passage 53 will receive the bead with that face presented uppermost which was presented to the last of the buffing wheels 17, and the passages 54 and 55 will successively present the other two faces of said bead. Mounted in vertically adjustable bearings 56 in the brackets 46, where adjustment is controlled by a hand-wheel 57 is a roller 58 grooved to correspond with the passages in guide plate 51, said roller 58 being driven in the direction of the feed rollers 28 by a sprocket chain extending between a sprocket wheel 59 on the shaft 60 of said roller 58 and sprocket wheel 61 on the toggle 29 of the shaft 26 of the discharge rollers 28, as shown in Figs. 2 and 4.

In operation the bead as it leaves the discharge rollers 28 is passed by hand into the passage 53 in guide plate 51, which carries it to the correspondingly shaped groove in roller 58, by which it is passed beneath the brushing wheel 48, which is reversely rotated by a suitable power driven band applied to pulley 62 on the shaft 47. The bead with one face thus brushed passes from roller 58 downwardly through guide 63 in the casing 49, and is then carried around by hand and again passed through said guide plate 51 but through passage 54, said bead being twisted one third to cause it to fit the contour of said passage 54. Said bead being thus directed to the corresponding groove in roller 58 is carried by the rotation of the latter again beneath brushing wheel 48 whereby another face thereof is brushed. This operation is repeated, the bead now being again twisted one third to bring its last face uppermost, so as to fit into passage 55, and said bead, after its passage for the third time beneath brushing wheel 48 is discharged through guide 63, all of said operations being illustrated diagrammatically in dotted lines in Fig. 13, the arrows indicating the direction of feed.

While I have described but a single brushing wheel 48 and its parts, still I have illustrated the same in duplicate to correspond with the duplicate sets of feed and discharge rollers 28, whereby the machine is adapted to brush simultaneously two lengths of bead.

Having thus described my invention, what I claim as new and desire to secure by Letters Patent is:

1. In a bead cleaning machine, cleaning means for operating on the bead, means for feeding the bead past said cleaning means, and a helical guide for carrying the bead and operating to turn the bead to present different faces to the cleaning means.

2. In a bead cleaning machine, cleaning means for operating on the bead, means for feeding the bead past said cleaning means, and a guide tube for carrying the bead having a helical groove for turning the bead to present different faces to the cleaning means.

3. In a bead cleaning machine, a series of cleaning wheels disposed in alinement and operating in the same plane, means for feeding the bead past said cleaning wheels, and a guide tube through which said bead passes operating to turn said bead during its passage therethrough to cause it to present different surfaces to the several cleaning wheels.

4. In a bead cleaning machine, a series of cleaning wheels disposed in alinement and operating in the same plane, means for feeding the bead past said cleaning wheels, and a guide tube having a helical groove therein through which the bead passes, said groove turning said bead to cause it to present different surfaces to the several cleaning wheels.

5. In a bead cleaning machine, a series of cleaning wheels disposed in alinement and operating in the same plane, means for feeding the bead past said cleaning wheels, and a guide tube through which the bead passes disposed in the path of rotation of said cleaning wheels, said tube being cut away at the points where the cleaning wheels contact therewith to expose the inclosed bead to said cleaning wheels.

6. In a bead cleaning machine, a series of cleaning wheels disposed in alinement and operating in the same plane, means for feeding the bead past said cleaning wheels, and a guide tube having a helical groove therein through which the bead passes, said groove turning said bead and being cut away at the points where the cleaning wheels contact therewith to expose the inclosed bead to said cleaning wheels.

7. In a bead cleaning machine, feed and delivery rollers at opposite ends of the machine, a series of cleaning wheels disposed in alinement between said feed and delivery rollers, and a guide tube through which the bead passes extending between said rollers and in the path of said cleaning wheels, said tube having an interior helical groove receiving and directing the bead and causing it to turn in its passage therethrough, and said tube being cut away at the points where said buffing wheels contact therewith to expose to said wheels the inclosed bead.

8. A guide tube for bead cleaning machines, comprising an outer casing, a guide bar disposed therein and helically grooved from end to end, and an intermediate sleeve disposed in the space between said guide bar and casing.

9. A guide tube for bead cleaning machines, comprising an outer casing, a guide bar disposed therein and helically grooved from end to end, and an intermediate sleeve disposed in the space between said guide bar and casing, said casing, sleeve and guide bar being cut away at intervals to expose the head in its passage therethrough.

10. In a bead cleaning machine, feed and delivery rollers at opposite ends of the machine, a series of cleaning wheels disposed in alinement between said feed and delivery rollers, a guide tube for the bead disposed between said rollers and in the path of said cleaning wheels, and means for shifting said rollers and guide tube toward or from said cleaning wheels.

11. In a bead cleaning machine, a series of cleaning wheels disposed in alinement, means for feeding and guiding the bead past said wheels and for exposing different surfaces of the bead to the successive wheels, a supplemental cleaning wheel at the discharge end of the machine, and means for carrying and guiding the bead a plurality of times past said wheel, each passage exposing a different face to said supplemental wheel.

In testimony whereof I have hereunto set my hand in the presence of two subscribing witnesses.

THOMAS MIDGLEY.

Witnesses:
JOHN CARLSON,
J. H. SWIFT.